(12) United States Patent
Lagerberg

(10) Patent No.: US 6,443,672 B1
(45) Date of Patent: Sep. 3, 2002

(54) CUTTING TOOL WITH NOZZLE

(75) Inventor: Stig Lagerberg, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/600,922

(22) PCT Filed: Jan. 26, 1999

(86) PCT No.: PCT/SE99/00110
§ 371 (c)(1),
(2), (4) Date: Sep. 8, 2000

(87) PCT Pub. No.: WO99/39852
PCT Pub. Date: Aug. 12, 1999

(30) Foreign Application Priority Data

Jan. 27, 1998 (SE) .................................. 9800212

(51) Int. Cl.[7] .............................................. B23B 27/10
(52) U.S. Cl. ................................ 407/2; 407/11; 407/5; 82/50
(58) Field of Search .................. 407/2, 4, 5, 6, 407/11; 82/50; 409/137; 408/56, 59, 60, 61

(56) References Cited

U.S. PATENT DOCUMENTS

| | | | |
|---|---|---|---|
| 2,653,517 A | 9/1953 | Pigott | |
| 4,322,189 A | * 3/1982 | Briese | .................. 409/136 |
| 4,699,047 A | * 10/1987 | Lee et al. | .................. 99/450 |
| 4,829,859 A | 5/1989 | Yankoff | |
| 4,955,264 A | 9/1990 | Armbrust | |
| 5,148,728 A | 9/1992 | Mazurkiewicz | |
| 5,226,506 A | * 7/1993 | Link | .................. 184/6.26 |
| 5,237,894 A | 8/1993 | Lindeke | |
| 5,272,945 A | 12/1993 | Lockard | |
| 5,340,242 A | 8/1994 | Armbrust et al. | |
| 5,346,335 A | 9/1994 | Harpaz et al. | |
| 5,388,487 A | 2/1995 | Danielsen | |
| 6,045,300 A | * 4/2000 | Antoun | .................. 407/11 |

FOREIGN PATENT DOCUMENTS

| | | |
|---|---|---|
| DE | 3740714 | 6/1989 |
| FR | 1583553 | 11/1969 |
| FR | 2244590 | 9/1973 |
| JP | 3-33005 | 4/1991 |
| SE | 429934 | 10/1983 |
| WO | 9605008 | 8/1995 |

* cited by examiner

Primary Examiner—Henry Tsai
(74) Attorney, Agent, or Firm—Burns, Doane, Swecker & Mathis, LLP

(57) ABSTRACT

A cutting tool includes a nozzle for directing coolant toward an insert seat disposed in the tool. The nozzle includes a bore which directs coolant toward a location on the seat that is spaced from a center hole in which the nozzle is mounted. A rear end of the nozzle is pressed against a fixed surface of the tool by the pressure of coolant. The bore in the nozzle is in non-coinciding relationship relative to the axis of the hole in which the insert is mounted. The bore can be angled relative to axis of the hole, or the bore can be parallel to, but radially offset from, the axis of the hole.

15 Claims, 3 Drawing Sheets

Figure 1:
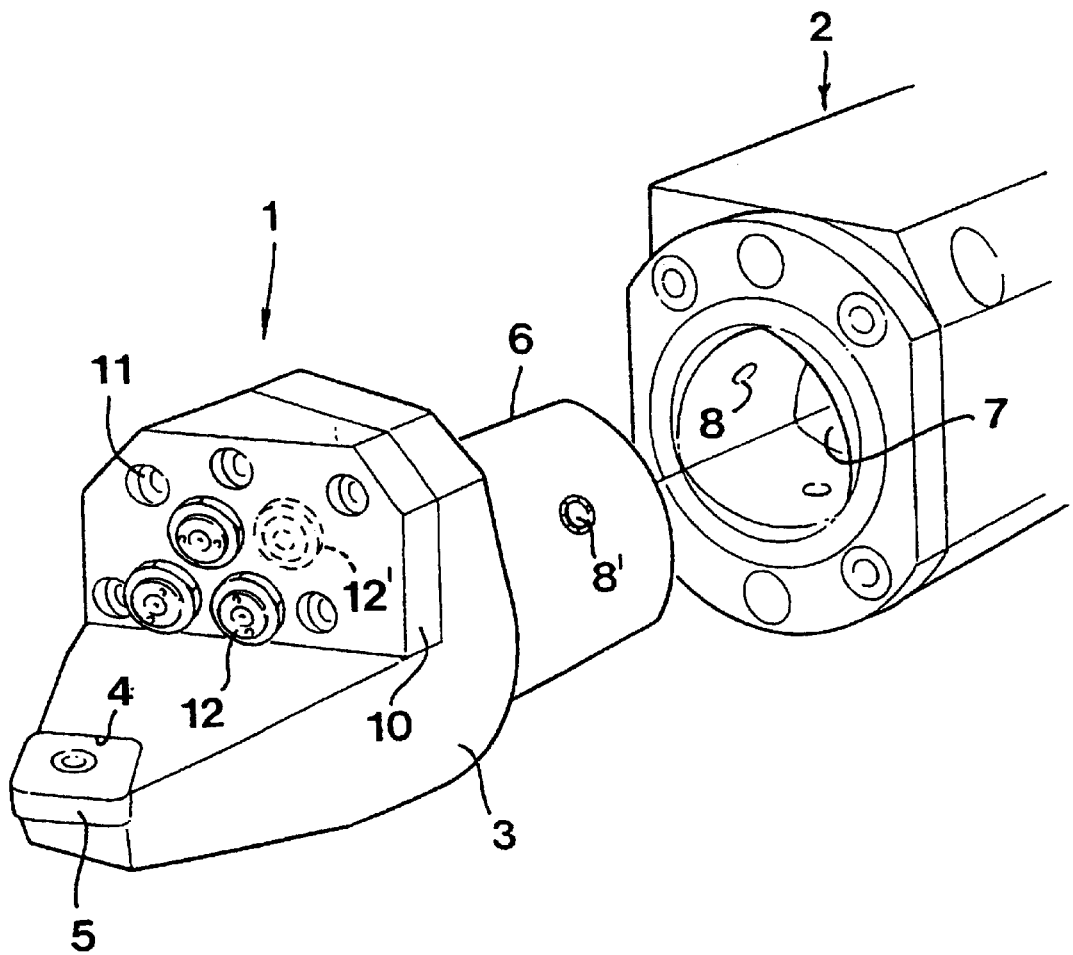

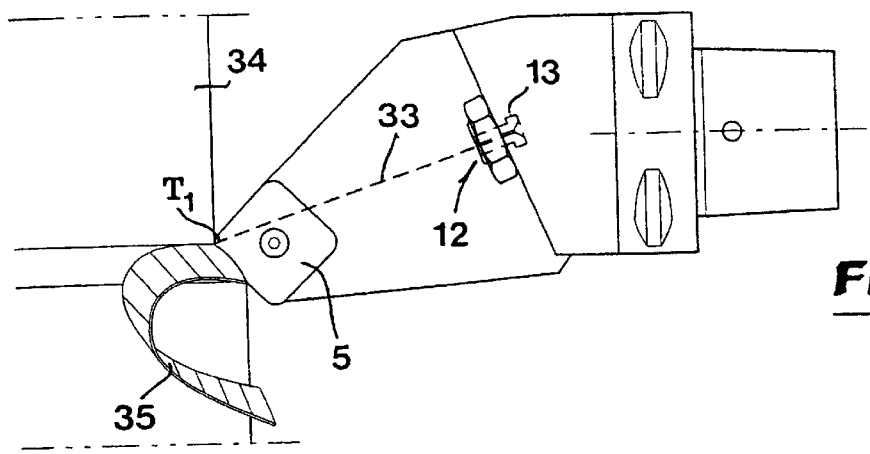
Fig 7
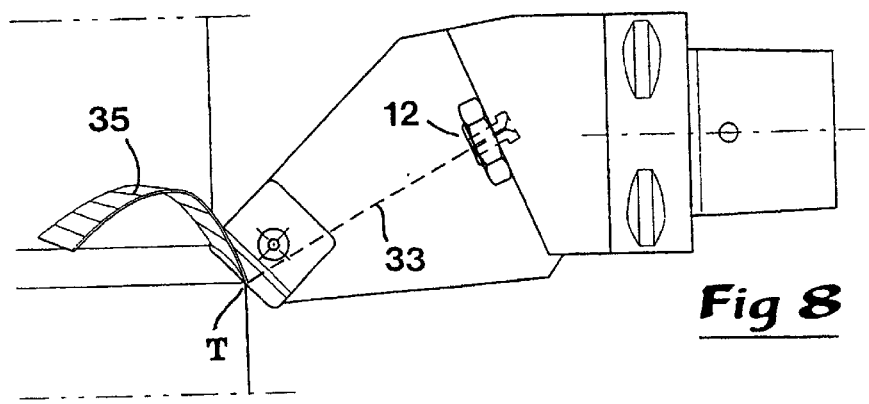
Fig 8
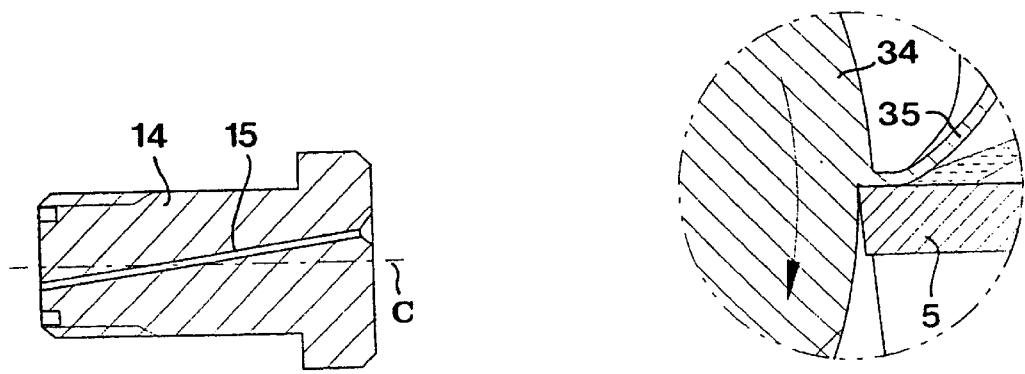
Fig 10
Fig 9

CUTTING TOOL WITH NOZZLE

THE TECHNICAL AREA OF THE INVENTION

This invention relates to a cutting tool of the type which comprises a body which has a seat for a cutting insert in a forward part and a channel, for the feeding of coolant to at least one nozzle. in a rear part, the channel includes a bore with orifices for inflow and outflow and which is mounted in a forward part which is exposed towards the seat in order to direct a jet of fluid towards the area of the seat, wherein the channel terminates in a cavity rearwards of said front part which communicates with the bore of the nozzle.

THE GENERAL BACKGROUND OF THE INVENTION AND THE STATE OF THE ART REGARDING THE TECHNOLOGY

To cool not only the cutting insert of a cutting tool, e.g. a tool for turning. but also the workpiece which is to be machined as well as the chips which are removed from the workpiece has been known a very long time. Earlier known devices for such cooling can be divided into three different main categories, namely a first category in which coolant is fed internally through the cutting insert, a second category in which at least one jet of liquid is directed towards the area of the insert from a spray device which is separate from the actual cutting tool, as well as a third category. to which the invention belongs, and which is characterized by having a cooling fluid channel built-into the actual tool and being linked to an inflow nozzle in the tool from which a jet of fluid can be aimed towards the area of the cutting insert. Examples of the first named category of cooling devices are to be found in for example SE 7901060-9, JP 3-33005, DE 3 740 814, U.S. Pat No. 5,237,894, U.S. Pat. No. 5,346,335 and FR 2 244 590, while examples of devices in the second category are to be found in, for example, FR 1 593 553, U.S. Pat. No. 4,829,859 and U.S. Pat. No. 2,653,517. Earlier known devices belonging to the third category are known through, for example, U.S. Pat. No. 4,955 264, U.S. Pat. No. 5,148,728. U.S. Pat. No. 5 340 242 and A fundamental aim within present day technology for chip forming metal cutting is to make it possible to use the highest possible pressure of the coolant and deliver it in the form of one or more thin jets directed mainly towards the cutting insert and the chips cut free by the cutting insert. The higher the pressure which can be used in the jet of fluid the greater will be the possibility use the jet of fluid to advantage not only for pure cooling, but also in order to mechanically influence the chips which are cut free from the workpiece more specifically with the object of breaking up the chips into as small particles as possible. Within the ranks of those skilled in the art there are differences in opinion as to what should be considered low and high pressure. Generally speaking however it should be possible to divide pressures according to the following intervals.

Low pressure<10 bar,

Medium pressure 10–100 bar, and

High-pressure>100 bar.

In older cutting tools cooling was carried out using fluids at low pressure, whereas somewhat more modern cutting tools have worked with fluid at medium pressure. In the more recent technology fluid pressures of hundreds of bars occur. Thus, for. example, the above cited U.S. Pat. No. 5,148,728 forecasts the use of fluid pressures up to 2,800 bar.

The present invention, which belongs to the third category of cooling devices according to the above definition, is based on two fundamental pieces of knowledge regarding cooling in connection with the chip forming machining of metal, partly that the exact point of impact of the jet of fluid has a major influence on whether or not a good result is to be achieved, partly and that high pressure in the jet makes for high demands on the mechanical strength and the ability to seal against leakage of fluid in the nozzle through which the fluid is to pass and be aimed before it impinges on the insert and/or chip in the form of a jet. In the tools described in U.S. Pat. No. 4,955,264, U.S. Pat. No. 5,148,728, U.S. Pat. No. 5,340,242 and WO 96/05008 the conical shaped nozzle is firmly or immovably fixed in the tool. This means that the jet of fluid will not allow itself, under any circumstances, to be redirected to other targets once the tool has been manufactured and installed.

To make it possible to change the direction of the cooling fluid a special type of nozzle device, which is, called "fish eye", by those skilled in the art, is used and this is well known. Such nozzles include a sleeve which at its one end features a thread with the help of which the sleeve can be fixed in a threaded hole in the front part which faces the cutting insert of the tool, and at its opposite end features a partially spherical seat. A ball with a through hole is inserted in this seat. after which the ball is permanently retained in the seat through plastic compression of the free end of the sleeve. In this case the ball can be rotated in relation to the seat against the effect of a frictional resistance in the border area between the ball and seat. more exactly by inserting a slender pin into the bore so that the ball can be brought to rotate to the required position of alignment by vibration.

Nozzles of the latter type can be used when the coolant is at low pressure, but at high pressure the force of impact of the fluid against the ball would be so large that there would be a clear risk that the ball would be forced out of the seat.

THE PURPOSE AND CHARACTERISTICS OF THE INVENTION

The present invention is aimed at eliminating the above mentioned weaknesses in the known cutting tools with cooling systems and thereby create a better cutting tool. A fundamental aim of the invention is thus to create a cutting tool which works with fluid cooling and which can work with extremely high fluid pressures and at the same time permit fine adjustment of the jet of fluid towards various required targets. more exactly with the aim of steering the chips in such a direction that they do not disturb the machining operation. An aim is even to create a cutting tool on which the adjustment of the nozzle, which shapes the jet of fluid, can be carried out in a simple manner from outside the tool without having to dismantle the tool. An additional aim is to create a cutting tool the nozzle of which is reliably sealed in respect to surrounding parts of the tool even in those cases where individual nozzles are exposed to extremely,high fluid pressures.

According to the present invention at least the basic aim is satisfied by a cutting tool wherein a nozzle is mounted in a body and aimed to eject a jet of cooling fluid toward an insert seat disposed on the body. The nozzle is arranged to be pressed against a sealing surface by pressurized cooling fluid. The direction of the jet can be adjusted by rotating the nozzle about its own longitudinal axis.

BRIEF DESCRIPTION OF ENCLOSED DRAWINGS

Figure 2:
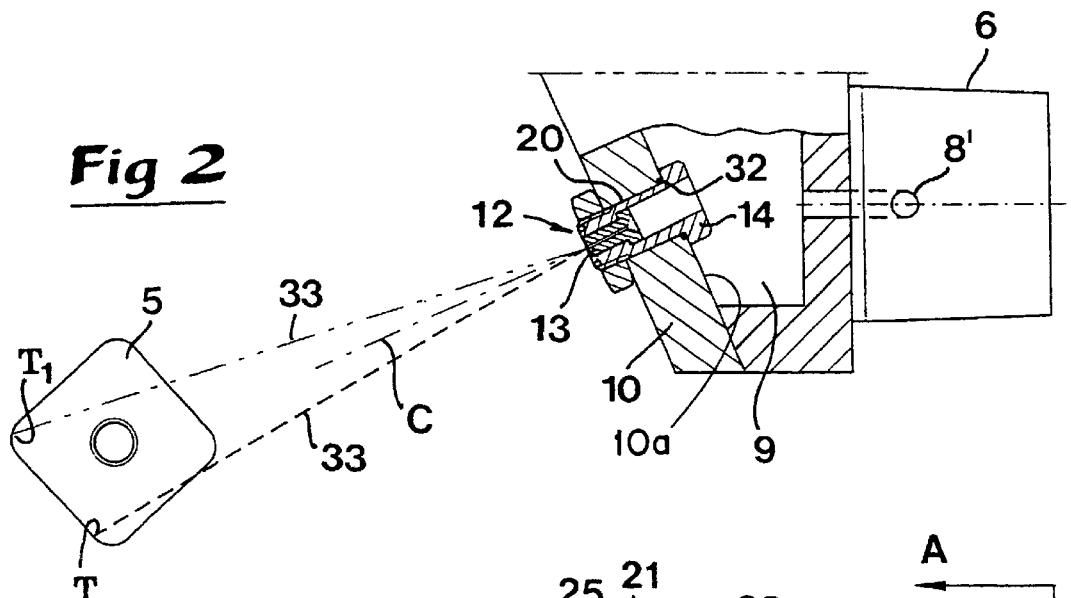

The drawings illustrate the following:

FIG. 1 a perspective, exploded view showing a cutting tool according to the invention plus a holder for the same, FIG. 2 a schematic, partial section view of the tool and its cutting insert from above.

Figure 3:
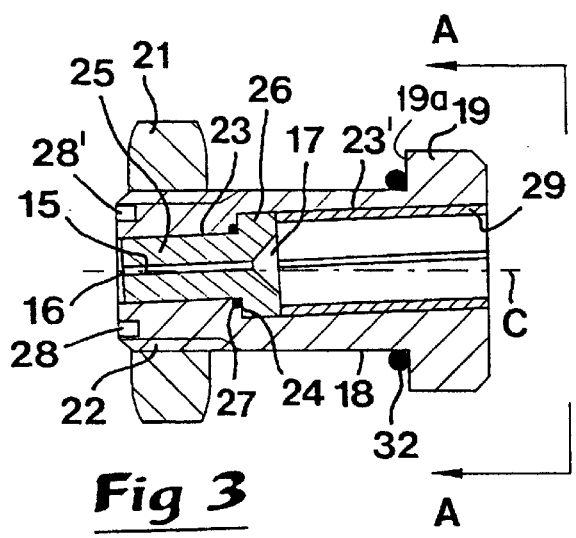
Figure 4:
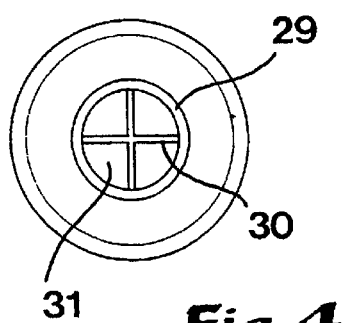
Figure 5:
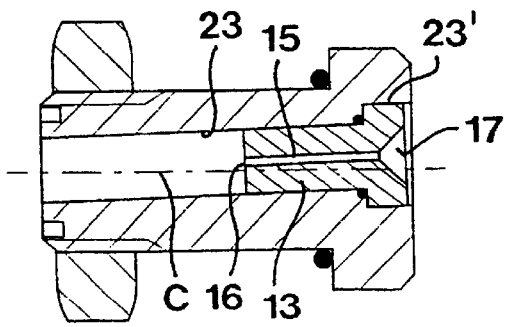
Figure 6:
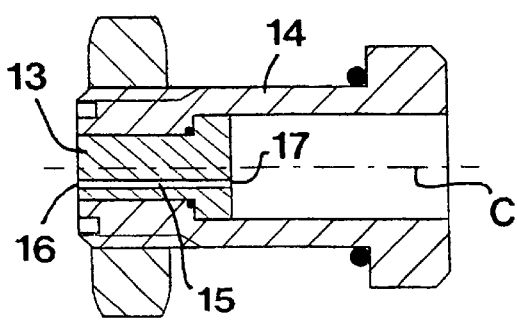

FIG. 3 a longitudinal section through a nozzle according to the invention,

FIG. 4 an end view A—A in FIG. 3,

FIG. 5 a longitudinal section equivalent to that in FIG. 3 showing an alternative embodiment of the nozzle, FIG. 6 a similar longitudinal section showing an additional, alternative embodiment of the nozzle, FIG. 7 a plan view from above of the tool in connection with the turning of a rotating workpiece, FIG. 8 a corresponding plan view showing a nozzle in another position than that in FIG. 7, FIG. 9 a partial section illustrating the tools insert in an enlarged view during the machining of the workpiece, and FIG. 10 a longitudinal section showing a fourth alternative embodiment of the nozzle.

DETAILED DESCRIPTION OF THE PREFERRED EMBODIMENTS OF THE INVENTION

Conventional Structure

A cutting tool 1 intnded for turning is shown in FIG. 1 plus a holder 2 for said tool. The tool I comprises a body, which in its entirety is designated 3 which in a forward part features a seat 4 for a cutting insert 5. A rear part 6 of the body has the shape of a male shaft arranged to be introduced into a seat 7 in the holder 2. In practice the holder can be of the CAPTO® type, whereby both the male shaft 6 as well as the seat 7 feature a polygonal cross-sectional shape. One or more channels 8 are formed in the holder 2 for the feeding of coolant to the tool. One or more similar channels 8' vent through the enveloping surface of the male shaft 6 and through them the coolant can be lead to a cavity inside the tool. This cavity is shown in FIG. 2 and is designated 9. More exactly this cavity is delimited by a front part 10 which in the embodiment example shown has the shape of a plate which is disengageably connected to the tool body via a screw connection. A number of holes for screws in this screw connection are designated 11 in FIG. 1.

One or more nozzles can be mounted in the front plate 10. In FIG. 1 it is indicated how three high-pressure nozzles 12 can be mounted in a united group relatively near each other. In addition it is indicated how even a low-pressure nozzle 12' can be arranged alongside the high-pressure nozzles, and communicate via a low-pressure fluid channel (not shown) which is separate from the cavity 9 and the channel 8'.

As far as the tool shown in FIG. 1 has been described so far it is the same in all-important aspects as those known previously.

Inventive Structure

Reference is now made to FIG. 24, which describes in detail a nozzle for high-pressure fluid produced in accordance with this,invention . From these figures it can be seen how the individual nozzles 12 comprise and partly an actual nozzle body 13, partly a nozzle insert designated 14 in which the nozzle body is assembled. The nozzle body 13 includes a through bore 15 with external and internal orifices 16, 17. In practice the bore should have a small diameter, e.g. within the range 0:5–1:5 mm but even larger bores can be considered. It should also be mentioned that it could be advantageous if the inner orifice 17 has a conical tapered shape.

The nozzle insert 14 is basically in the shape of a bushing and features a rotationally symmetrical outer surface 18, which in the example is cylindrical in shape. At its rear end the insert features a flange 19 which projects outwards like a collar from the cylindrical outer surface. The insert is installed in a hole designated 20 in the front plate 10. This hole has a cylindrical or rotationally symmetrical shape corresponding to the envelope surface on the nozzle insert. In practice the envelope surface of the insert should have a have fine fit (friction fit) in respect to the inner surface wall of the hole. When the insert is installed in the hole 20 the flange 19, which acts as a stopping device abuts against the inside of the front plate 10.

Since both the envelope surface 18 of the insert and the wall surface of the hole 20 are rotationally symmetrically shaped, the insert allows itself to be twisted between different angles of rotation in relation to the hole. The insert is however lockable in whichever position is wished. In the example the insert sleeve is lockable with the help of a threaded joint which comprises a nut 21 and an external thread 22 on a forward sleeve part which shoots out beyond the front plate 10.

In FIG. 3C There is shown a geometrical center axis about which the envelope surface 18 of the insert is concentric. A through hole is formed in the nozzle insert with a first section 23 nearest the outer end of the insert and second section 23', which has a larger diameter than the first section of the hole and is separated from it by an abutment surface 24 which is set at an angle. In the example, according to FIG. 2–4, the first section of the hole 23 has a considerably smaller axial extension than the second section of the hole 23'. As can be seen from FIG. 3 the through hole 23, 23' is angled in relation to the center axis of the insert 14; which means that a fluid jet which is formed in the bore 15, in the body of the nozzle will be angled in relation to the center axis of the sleeve. In practice the angle between the through hole and center axis of the insert can be moderate. For example it can lie in the range 1–5°.

In a similar manner to the actual nozzle insert, the body of the nozzle 13 comprises a cylindrically shaped main part 25 which has smaller diameter than that of a collared stop flange 26 which abuts against the abutment surface 24 between both the cavities 23, 23'. In connection to said abutment surface 24 a ring-shaped groove is cut out from the wall of through hole and in which is arranged a sealing ring 27. In practice the body of the nozzle can include, in conjunction with the bore 15, for example sapphires (not shown), with excellent wear resistance characteristics in order to ensure that the working life of the nozzle is long.

Two diametrically opposed recesses 28, 28' are formed in the outer end surface of the nozzle insert. They are designed to receive respective two protrusions on a key with the help of which the insert can be twisted when the nut 21 is to be unscrewed.

In the relatively long part of the hole section 23' which is situated rearward of stop flange 26 on the body of the nozzle a device 29 is arranged the purpose of which is to divide the flow of cooling fluid through the hole section into a number of partial flows. As shown in FIG. 4 this device can to advantage consist of a length of tube inside which is found a number of wings 30 between which are delimited numerous passages 31. In the example four such wings are shown, which delimit just as many passages and which in this manner divide the incoming fluid flow in four partial flows. By dividing the fluid in this manner into several partial flows the tendency to turbulence in the fluid when it is to pass the hole section 23' is counteracted.

The hole 20 in the body plate 10 features at its rear end an annular groove for receiving a sealing ring 32. This sealing ring may have the form of a conventional O-ring and be produced in a relatively hard, but elastic material. By over-dimensioning the sealing ring somewhat in relation to the groove in which it is to be received a good sealing effect is achieved. In this connection it should be pointed out that the sealing effect of the ring basically increases with increased fluid pressure in the cavity 9 in that this pressure acts on the stop flange 19, of the insert, which abuts against the inside of the front plate 10, with the sealing ring compressed between a rearwardly facing surface 10a of the plate 10 and a forwardly facing face 19a of the flange 19.

The nozzle which has been described functions as follows: Because the bore 15 in the body 13 of the nozzle is angled in relation to the center axis C of the insert the jet of fluid 33 which is shaped in the bore will come to have a point of impact (against the cutting insert or on one of the chips which are cut free) which is eccentric or displaced sideways in relation to the center axis C. This eccentric distance between the impact point T and the center axis C varies by anything from tenths of a millimetre to one or several millimetres depending not only on the angular displacement of the bore but even the distance between the nozzle and the cutting insert 1.

If, after the installation of the cutting tool, it should become apparent that the individual nozzle gives a jet of fluid which does not hit the desired point of impact T the nozzle can be readjusted. This is achieved by screwing loose the nut 21, after which the insert 14 is twisted, in relation to the hole 20 in the front plate 10. In this way the direction of the jet of fluid can be changed to whatever situation is required between two diametrically opposite extremes. For example the jet can be reset from a point of impact T to a point of impact T, which are diametrically opposite relative to the center axis C. Once the body of the nozzle has been set in the desired position it is fixed in place by tightening the nut 21.

In the embodiment according to FIGS. 2–4 the hole 23 is comparatively short, whilst the other, wider hole 23' is considerably longer. This means that the nozzle 13 in this case is located in immediate proximity to the external end of the nozzle insert. An alternative embodiment is shown in FIG. 5 in which the narrow hole 23A of the insert 14A extends over the larger part of the total length of the through hole, whilst the wider hole 2A is much shorter. This means that the body of the nozzle 13, in this case, is located in immediate proximity to the rear or inner end of the nozzle insert. The inner orifice 17 to the bore 15 is therefore located in immediate proximity to the cavity 9 for high-pressure fluids. Since the angle by which the bore 15 can be offset in relation to the center axis C is limited, the shaped jet of fluid can pass freely through the hole 23 despite the fact that the outer orifice 16 is to be found deep within the hole.

Both the embodiment according to FIG. 3 and that according to FIG. 5 are based on A the idea that the bore of the nozzle body is angled relative to the center axis of the nozzle insert in order to enable relocation or adjustment of the point of impact of the jet of fluid along a semi-circular arch between different positions which are displaced sideways in relationship to each other. In these cases the positions of the points of impact depend on the axial distance between the nozzle and point of impact. More exactly if the distance between two diametrically opposed extreme positions becomes greater, the greater will be the axial distance which arises between the nozzle and the point of impact. In FIG. 6 an embodiment is shown in which the distance of separation between different points of impact is independent of the axial distance between nozzle and the cutting insert. In this case the bore 15B in the body of the nozzle 13 is parallel to the center axis of the nozzle insert, 14B even though it is located eccentricalyin relation to it. The shaped jet of fluid in this case will be always parallel to the center axis C, but can be displaced sideways by twisting the insert in the associated hole. More exactly, the point of impact of the jet of fluid (as in embodiments described earlier) follows a semi-circular path with similar movements sideways.

Reference is now made to FIGS. 7–9, which illustrate the application of the described cutting insert in connection with turning of a work piece 34. During such machining the insert 5 removes a chip 35 the characteristics of which with regard to length, width, thickness and curved shape can vary considerably depending on many external factors, such as the material of the workpiece, the feed, type of insert, etc. In many types of chip removing matching such as turning in automatic bar machines, chip forming constitutes a problem, which may be difficult to overcome. If for example the chip which is cut free has a propensity to stick and twist together, in long, continuous spiral formations tangled bunches will be successively formed in the area around both the cutting tool and the workpiece. There is therefore a general desire to break up the chips into smaller bits as efficiently as possible. In certain cases, namely when the material of the workpiece has extraordinarily high toughness, it can however be difficult to break up the chips even if a high pressure jet of cooling which is brought to act on them. The present invention, which allows fine adjustment of the jet of fluid, offers an opportunity to influence, as one will, either of the two longitudinal sides of the chip, more exactly with the aim of steering the chip in the direction desired. The problem with inevitable chip tangles can be overcome or at least significantly reduced provided that the chips can be lead in such a direction that they do not tend to entwine with each other or fasten around the tool and /or the workpiece. In FIG. 7 it is indicated how the jet of fluid 33 is set up so that it impinges upon the right hand part of the chip at the point of impact $T_1$ Should it become apparent under operation that it is not possible to effectively break up the chips with the help of the jet of fluid, or that the chips tend to be driven away from the cutting insert in such a direction that they wind themselves fast in, for example the cutting tool, the jet, as described previously, can be realigned to impinge on the opposite side of the chip, that is to say the left hand side at the point of impact T as is illustrated in FIG. 8. When the effective force of the jet is sufficiently high and acts upon the opposite edge of the chip, the chip can be influenced to move in another direction in which it does not fasten in tangles. Thanks to the positional adjustability of the nozzle there remains even a possibility to direct the jet towards the center of the chip, e.g. in those cases where the material of the workpiece is not so tough that the effect of the jet can break up the chips into smaller units.

FIG. 10 illustrates an alternatively embodiment in which the bore 15C which shapes the jet is formed directly in the body 14C of a nozzle insert, that is to say without any separate nozzle body inside the insert. In the example illustrated the bore 15C is angled relative to the center axis C of the nozzle insert. The bore could also be parallel to the axis C while simultaneousty being eccentric in it, relationship to it, in the same manner as in the embodiment according to FIG. 6.

Substantial advantages to be obtained with the invention are not only that a high pressure jet can be finely adjusted to different, exact, points of impact but also that the resetting of the jet can be carried out from the exterior of the tool without having to resort to disassembling it or the associated holder. Thus resetting of the nozzle is made possible using the simple manual operation of loosening the nut and twisting an insert in which the bore of the nozzle is to be found. The design which is described and illustrated in the figures permits, in addition, use of extremely high pressure without leading to problems with sealing at the connection to the nozzle. An advantage with the embodiment according to FIGS. 3, 5 and 6 is even that the body of the nozzle in the individual inserts can be exchanged to other nozzle bodies with other performances.

CONCEIVABLE MODIFICATIONS OF THE INVENTION

The invention is not limited only to the embodiments described and illustrated above. It is therefore possible to think in terms of combining an angled position of that jet shaped bore in the body of the nozzle with an eccentric location of the aperture of the bore in relationship to the center line of the insert. It is also conceivable to design the actual nozzle with a bore, which is angled relative to the center axis of the body or longitudinal direction. In the latter case, should the through hole in the nozzle insert be parallel or concentric with the geometrical center axis of the nozzle insert. Likewise it is conceivable that other means than just a threaded connection of the type described can be used to fix the nozzle insert in the required position.

What is claimed is:

1. A cutting tool comprising:
    a body including:
        a seat disposed in a front part of the body and adapted to receive a cutting insert,
        a channel adapted to conduct coolant,
        a cavity disposed at a front end of the channel, and
        a nozzle-mounting wall including front and rear surfaces, the front surface facing generally forwardly toward the seat, and the rear surface facing rearwardly away from the seat and defining part of the cavity, the wall further including a hole extending therethrough from the rear surface to the front surface; and
    a nozzle mounted in the hole and including:
        an outlet communicating with the channel for ejecting coolant toward a location at the insert seat spaced from a front-to-rear extending center longitudinal axis of the hole,
        an envelope surface portion mounted in the hole and rotatable relative to a surface of the hole about the longitudinal axis of the hole, wherein the direction of ejected coolant is changed in response to rotation of the nozzle,
        a locking element locking the nozzle in respective rotary positions, and a flange disposed at a rear end of the envelope surface portion, the flange having a front face which faces forwardly toward the rear surface of the nozzle-mounting wall and disposed in the cavity, wherein pressure of the coolant presses the flange toward the rear surface.

2. Cutting tool according to claim 1 wherein a front portion of the envelope surface portion projects forwardly from a front surface of the nozzle-mounting wall and is externally threaded; the locking element comprising a nut threadedly mounted on the external thread for engaging the front surface to hold the nozzle in selected rotary positions.

3. Cutting tool according to claim 2 wherein the nozzle includes a bore extending therethrough; the outlet disposed at a front end of the bore, the bore being in non-coinciding relationship with the center axis of the hole.

4. Cutting tool according to claim 2 wherein the outlet is disposed eccentrically relative to the axis of the hole.

5. Cutting tool according to claim 2 wherein the nozzle comprises an insert on which the envelope surface portion is disposed, and a nozzle body disposed in a hole formed in the insert, the nozzle body including a bore extending therethrough, with the outlet disposed at a front end of the bore.

6. Cutting tool according to claim 5 wherein the hole formed in the insert includes front and rear sections, the front section being of smaller cross sectional size than the rear-section, and a rearwardly facing abutment surface disposed between the front and rear sections, the nozzle body including a shank disposed in the front hole section, and a flange abutting the abutment surface.

7. Cutting tool according to claim 5 wherein the hole formed in the insert is disposed at an acute angle with a center axis of the hole formed in the nozzle-mounting wall.

8. Cutting tool according to claim 5 wherein the insert includes recesses in a forwardly facing end thereof for receiving a turning tool.

9. Cutting tool according to claim 6 wherein a length of the front hole section is shorter than a length of the rear hole section, a device disposed in the rear hole section for dividing the flow of coolant into a plurality of separate flows.

10. Cutting tool according to claim 1 wherein the nozzle includes a bore extending therethrough; the outlet disposed at a front end of the bore; the bore being in non-coinciding relationship with the center axis of the hole.

11. Cutting tool according to claim 1 wherein the bore forms an angle greater than zero relative to the center axis of the hole.

12. Cutting tool according to claim 1 wherein the bore is parallel to, and radially offset from, the center axis of the hole.

13. Cutting tool according to claim 1 wherein the nozzle comprises an insert on which the envelope surface portion is disposed; and a nozzle body disposed in a hole formed in the insert; the bore disposed in the body; the hole formed in the insert disposed at an acute angle with a center axis of the hole formed in the nozzle-mounting wall.

14. Cutting tool according to claim 1 wherein the nozzle includes recesses in a forwardly facing end thereof for receiving a turning tool.

15. Cutting tool according to claim 1 further including a seal element compressed between the rear surface of the nozzle-mounting wall and the front face of the flange.

\* \* \* \* \*